US007506442B2

(12) United States Patent
Shim et al.

(10) Patent No.: US 7,506,442 B2
(45) Date of Patent: Mar. 24, 2009

(54) METHOD OF FABRICATING INKJET PRINTHEAD

(75) Inventors: Dong-sik Shim, Suwon-si (KR); Hyung Choi, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 352 days.

(21) Appl. No.: 11/423,982

(22) Filed: Jun. 14, 2006

(65) Prior Publication Data

US 2007/0131648 A1 Jun. 14, 2007

(30) Foreign Application Priority Data

Dec. 8, 2005 (KR) ..................... 10-2005-0119252

(51) Int. Cl.
*B23P 17/00* (2006.01)
*G01D 15/00* (2006.01)

(52) U.S. Cl. .......................... 29/890.1; 29/611; 29/830; 29/831; 29/832; 216/27

(58) Field of Classification Search ................ 29/890.1, 29/611, 830, 831, 832; 216/27, 55, 57; 347/65, 347/62, 66, 55, 56
See application file for complete search history.

(56) References Cited

U.S. PATENT DOCUMENTS 4,894,664 A * 1/1990 Tsung Pan ................... 347/63
5,945,260 A * 8/1999 Miyagawa et al. .......... 430/320
6,520,627 B2 * 2/2003 Chen et al. ..................... 347/63
6,895,668 B2 * 5/2005 Imamura ................... 29/890.1

* cited by examiner

*Primary Examiner*—David P Bryant
*Assistant Examiner*—Tai Nguyen
(74) *Attorney, Agent, or Firm*—Stanzione & Kim, LLP

(57) ABSTRACT

A method of fabricating an inkjet printhead. The method of fabricating an inkjet printhead includes sequentially forming an insulating layer, a heater, and an electrode on a substrate and forming a passivation layer on the insulating layer to cover the heater and the electrode; forming a trench that exposes the substrate by sequentially etching the passivation layer and the insulating layer; forming a sacrificial layer to form an ink chamber on the passivation layer to fill the trench; forming a seed layer to provide a plating on the sacrificial layer and the passivation layer; forming a nozzle mold on the seed layer positioned over the heater; forming a plating layer on the seed layer to a predetermined thickness; forming an ink feed hole by etching a rear surface of the substrate to expose the sacrificial layer which is filled in the trench; forming a nozzle by sequentially removing the nozzle mold and the seed layer positioned under the nozzle mold; and forming the ink chamber by removing the sacrificial layer which is exposed by the nozzle and the ink feed hole.

22 Claims, 7 Drawing Sheets

METHOD OF FABRICATING INKJET PRINTHEAD

CROSS-REFERENCE TO RELATED APPLICATIONS

This application claims the benefit of Korean Patent Application No. 10-2005-0119252, filed on Dec. 8, 2005, in the Korean Intellectual Property Office, the disclosure of which is incorporated herein in its entirety by reference.

BACKGROUND OF THE INVENTION

1. Field of the Invention

The present general inventive concept relates to a method of fabricating an inkjet printhead, and more particularly, to a method of fabricating an inkjet printhead using a simple process.

2. Description of the Related Art

An inkjet printhead is an apparatus that ejects minute ink droplets on desired positions of recording paper in order to print predetermined color images. Inkjet printheads are categorized into two types according to the ink droplet ejection mechanism thereof. The first one is a thermal inkjet printhead that ejects ink droplets due to an expansion force of ink bubbles generated by thermal energy. The other one is a piezoelectric inkjet printhead that ejects ink droplets by a pressure applied to ink due to the deformation of a piezoelectric body.

The ink droplet ejection mechanism of the thermal inkjet printhead is as follows. When a current flows through a heater made of a heating resistor, the heater is heated and ink near the heater in an ink chamber is instantaneously heated up to about 300° C. Accordingly, ink bubbles are generated by ink evaporation, and the generated bubbles are expanded to exert a pressure on the ink filled in the ink chamber. Thereafter, an ink droplet is ejected through a nozzle out of the ink chamber.

FIG. 1 is a schematic cross-sectional view of a conventional thermal inkjet printhead. Referring to FIG. 1, the conventional inkjet printhead includes a substrate 10 on which a plurality of material layers are formed, a chamber layer 20 stacked on the substrate 10, and a nozzle layer 30 stacked on the chamber layer 20. An ink chamber 22 filled with ink to be ejected is formed in the chamber layer 20 and a nozzle 32, through which ink is ejected, is formed in the nozzle layer 30. In addition, the substrate 10 has an ink feed hole 11 to supply ink to the ink chamber 22.

A typical silicon substrate is used as the substrate 110. An insulating layer 12 for insulation between a heater 13 and the substrate 10 is formed on the substrate 10. The insulating layer 12 is typically made of silicon oxide. The heater 13 is formed on the insulating layer 12 to heat the ink of the ink chamber 22 and generate bubbles. An electrode 14 is formed on the heater 13 to apply current to the heater 13. A passivation layer 15 is formed on the heater 13 and the electrode 14 to protect the heater 13 and the electrode 14. The passivation layer 15 is typically made of silicon oxide or silicon nitride. An anti-cavitation layer 16 is formed on the passivation layer 15. The anti-cavitation layer 16 protects the heater 13 from a cavitation force generated when the bubbles vanish and is typically made of tantalum (Ta).

FIGS. 2A through 2D illustrate a conventional method of fabricating the inkjet printhead of FIG. 1. Referring to FIG. 2A, an insulating layer 12 is formed on a substrate 10 and a heater 13 and an electrode 14 are sequentially formed on the insulating layer 12. Then a passivation layer 15 is formed on the insulating layer 12 to cover the heater 13 and the electrode 14 and an anti-cavitation layer 16 is formed on the passivation layer 15. Next, the passivation layer 15 and the insulating layer 12 are sequentially etched, and thus a trench 17 that exposes a surface of the substrate 10 is formed. Then, referring to FIG. 2B, a predetermined material is coated on the structure illustrated in FIG. 2A and is patterned to form a chamber layer 20, which includes an ink chamber 22 as illustrated in FIG. 1. Then, a sacrificial layer 25 is formed to fill the ink chamber 22 and the trench 17, and a top surface of the sacrificial layer 25 is planarized using a chemical mechanical polishing (CMP) method. Next, referring to FIG. 2C, a predetermined material is coated on the top surface of the sacrificial layer 25 and the chamber layer 20 and is patterned, and thus a nozzle layer 30 which includes a nozzle 32 is formed. Next, referring to FIG. 2D, a rear surface of the substrate 10 is etched such that the sacrificial layer 25 is exposed, and thus an ink feed hole 11 is formed. Then the sacrificial layer 25, which is exposed by the ink feed hole 11 and the nozzle 32 is removed, and thus the ink chamber 22 is formed.

However, in the above described method of fabricating an inkjet printhead, several patterning processes are required and the thickness of the chamber layer 20 cannot be easily obtained as desired using the CMP.

SUMMARY OF THE INVENTION

The present general inventive concept provides method of fabricating an inkjet printhead using a simple process.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing a method of fabricating an inkjet printhead including sequentially forming an insulating layer, a heater, and an electrode on a substrate, and forming a passivation layer on the insulating layer to cover the heater and the electrode, forming a trench that exposes the substrate by sequentially etching the passivation layer and the insulating layer, forming a sacrificial layer to form an ink chamber on the passivation layer to fill the trench, forming a seed layer to provide a plating on the sacrificial layer and the passivation layer, forming a nozzle mold on the seed layer positioned over the heater, forming a plating layer on the seed layer to a predetermined thickness; forming an ink feed hole by etching a rear surface of the substrate to expose the sacrificial layer filled in the trench, forming a nozzle by sequentially removing the nozzle mold and the seed layer positioned under the nozzle mold, and forming the ink chamber by removing the sacrificial layer exposed by the nozzle and the ink feed hole.

The substrate may be made of silicon, and the insulating layer may be made of silicon oxide.

The heater may be formed by depositing a heating resistor on a top surface of the insulating layer and patterning the heating resistor. The electrode may be formed by depositing a conductive metal on a top surface of the heater and patterning the metal.

The passivation layer may be made of silicon oxide and silicon nitride.

After the forming of the passivation layer, forming an anti-cavitation layer on a top surface of the passivation layer that forms the bottom of the ink chamber may be further included. The anti-cavitation layer may be made of tantalum (Ta).

The sacrificial layer may be formed by coating a predetermined material on the passivation layer and patterning the material in a shape of the ink chamber. The sacrificial layer may be formed of a photoresist or a photosensitive polymer.

The seed layer may be made of at least one metal selected from the group consisting of copper, gold, nickel, titanium, and chrome. The plating layer may be made of at least one metal selected from the group consisting of copper, gold, and nickel.

The plating layer may be formed by electroplating.

The nozzle mold may be made of a photoresist or a photosensitive polymer. The nozzle mold may have a cross section tapering upward.

The foregoing and/or other aspects and utilities of the present general inventive concept are achieved by providing a method of fabricating an inkjet printhead comprising forming a sacrificial layer over a thermal heating device of the inkjet printhead to form an ink chamber, forming a seed layer to provide plating on the sacrificial layer and thermal heating device, forming a nozzle mold on the seed layer positioned over the thermal heating device, forming a plating layer on the seed layer to a predetermined thickness, forming an ink feed hole by etching a rear surface of the thermal heating device to expose the sacrificial layer, forming a nozzle by sequentially removing the nozzle mold and the seed layer positioned under the nozzle mold, and forming the ink chamber by removing the sacrificial layer exposed by the nozzle and the ink feed hole.

The foregoing and/or other aspects and utilities of the present general inventive concept are achieved by providing a method of fabricating an inkjet printhead, comprising forming a sacrificial layer over a thermal heating device including heaters of the inkjet printhead to form an ink chamber, forming a nozzle mold on the sacrificial layer and above each heater, forming a plating layer on the sacrificial layer and along sides of each nozzle mold to a predetermined thickness, forming an ink feed hole by etching a rear surface of the thermal heating device to expose the sacrificial layer, forming nozzles by sequentially removing each nozzle mold, and forming the ink chamber by removing the sacrificial layer exposed by the nozzles and the ink feed hole.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
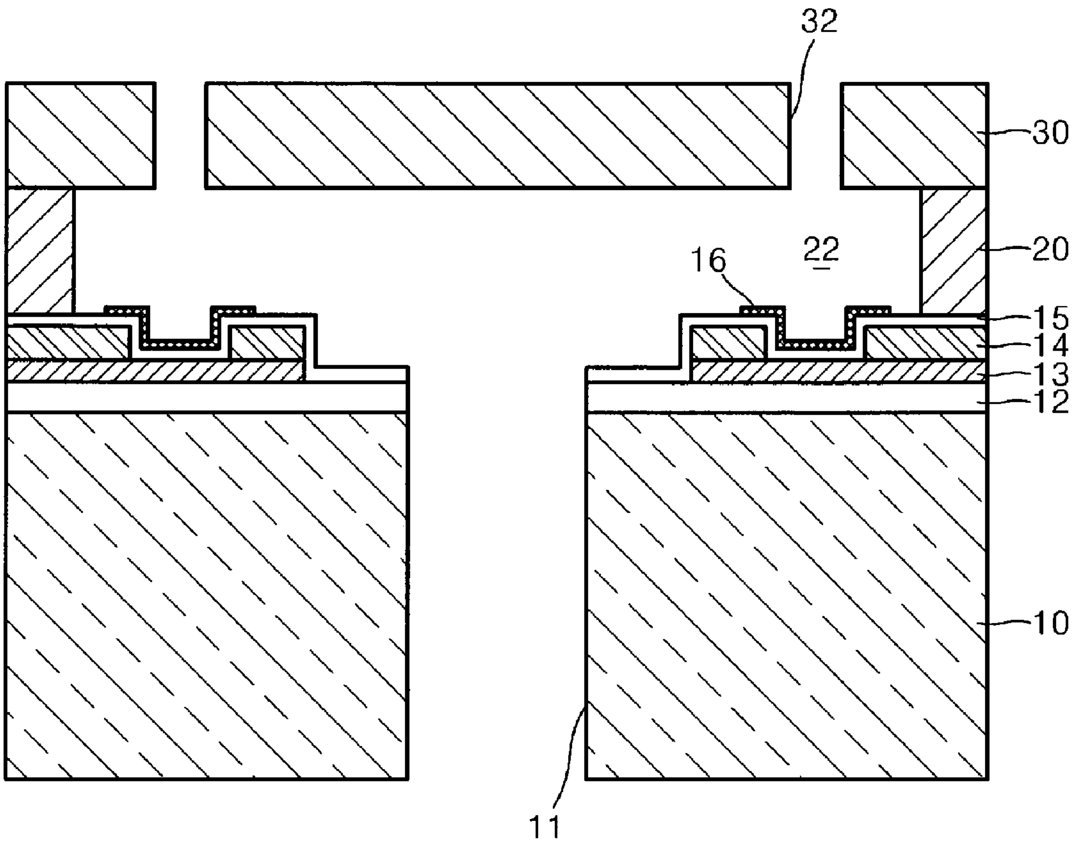
FIG. 1 (PRIOR ART)
FIG. 1 is a schematic view of a conventional inkjet printhead.
Figure 2A:
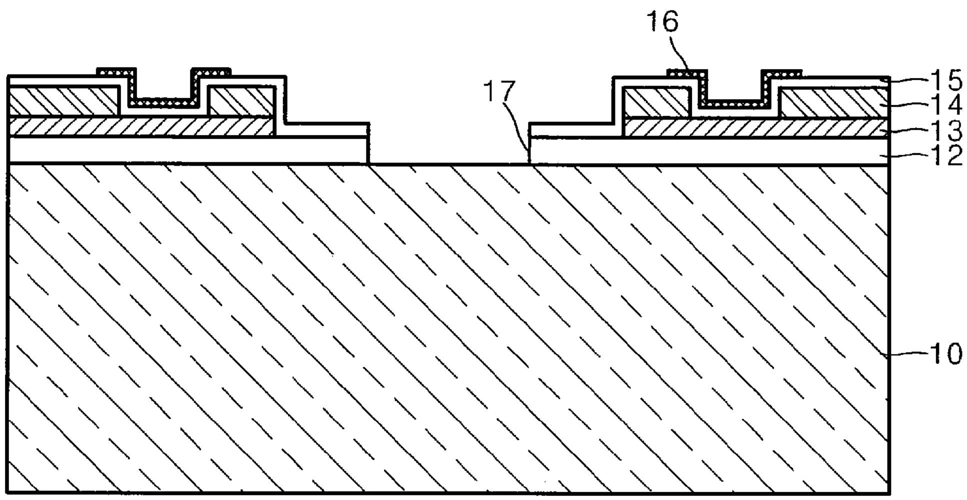
FIG. 2A (PRIOR ART)
FIGS. 2A through 2D illustrate a conventional method of fabricating the inkjet printhead of FIG. 1.
Figure 2B:
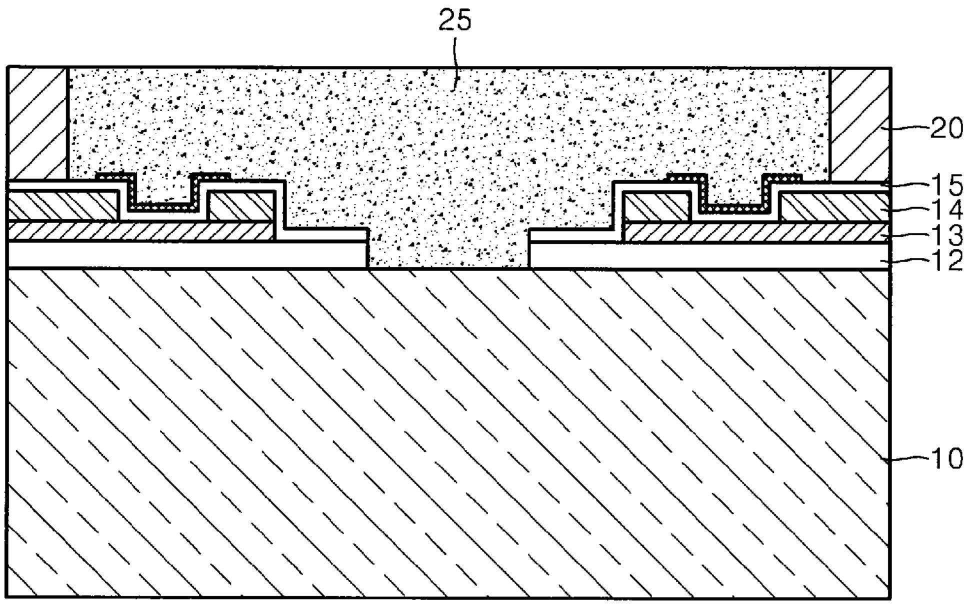
FIG. 2B (PRIOR ART)
Figure 2C:
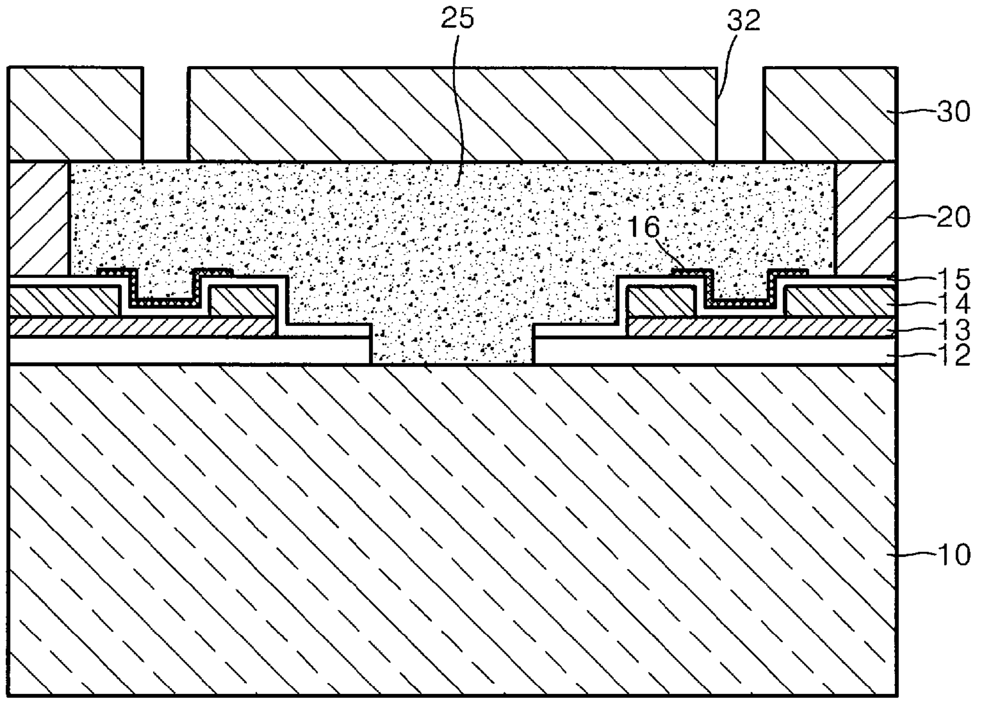
FIG. 2C (PRIOR ART)
Figure 2D:
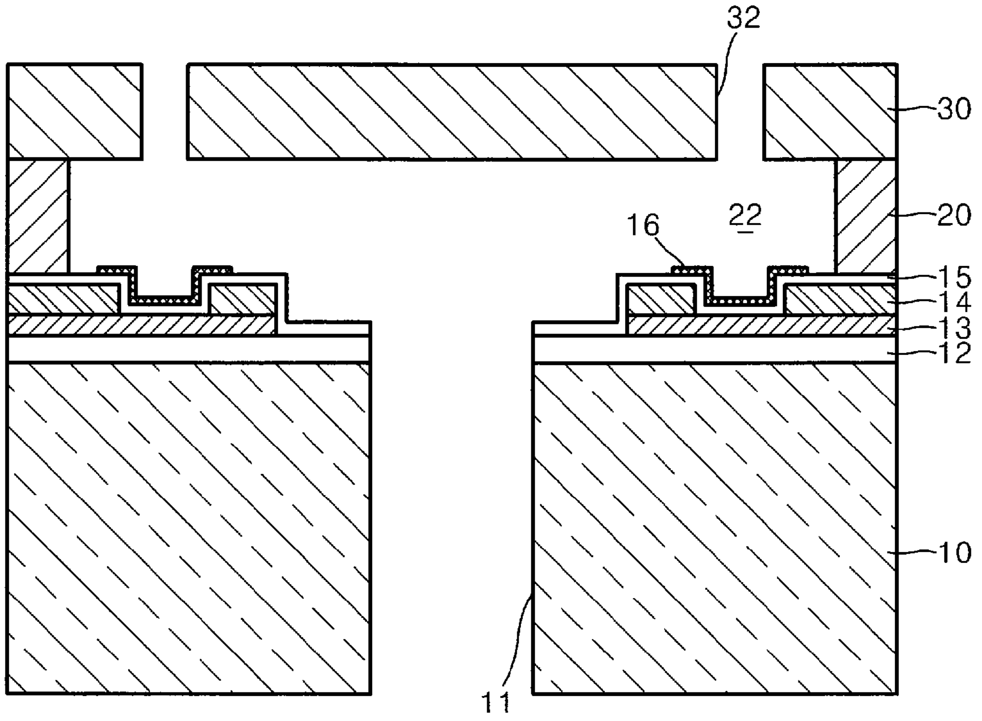
FIG. 2D (PRIOR ART)

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3A:
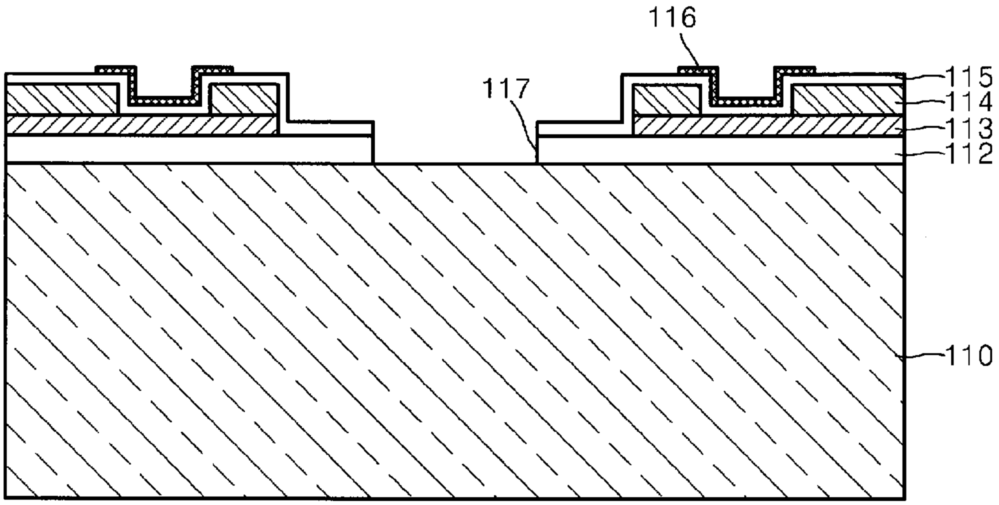
FIGS. 3A through 3H illustrate a method of fabricating an inkjet printhead according to an embodiment of the present general inventive concept.

FIGS. 3A through 3H illustrate a method of fabricating an inkjet printhead according to an embodiment of the present general inventive concept. Referring to FIG. 3A, first, a substrate 110 is provided. The substrate 110 may be typically a silicon substrate. An insulating layer 112 is formed to a predetermined thickness on a top surface of the substrate 110. The insulating layer 112 insulates a heater 113 from the substrate 110 thermally and electrically and may be typically be made of silicon oxide. The heater 113 that heats the ink to generate bubbles is formed on the insulating layer 112. The heater 113 may be made by depositing a heating resistor made of tantalum-aluminum alloy, tantalum nitride, titanium nitride, or tungsten silicide and patterning the heating resistor in a predetermined shape. An electrode 114 is formed on the heater 113 to apply current to the heater 113. The electrode 114 may be formed by depositing a metal having good electric conductivity like aluminum, aluminum alloy, gold, or silver and patterning the metal to a predetermined shape. A passivation layer 115 is formed on the insulating layer 112 to cover the heater 113 and the electrode 114. The passivation layer 115 protects the heater 113 and the electrode 114 from oxidization or corrosion when they contact the ink and may be typically made of silicon oxide or silicon nitride. An anti-cavitation layer 116 is further formed on a top surface of the passivation layer 115 that forms the bottom of the ink chamber 122. The anti-cavitation layer 116 protects the heater 113 from a cavitation force generated when the bubbles vanish and may be made of tantalum. Then, a trench 117, which exposes a top surface of the substrate 110, is formed by sequentially etching the passivation layer 115 and the insulating layer 112. The trench 117 is formed in the upper position of an ink feed hole 111 shown in FIG. 3H, which will be described later.

Figure 3B:
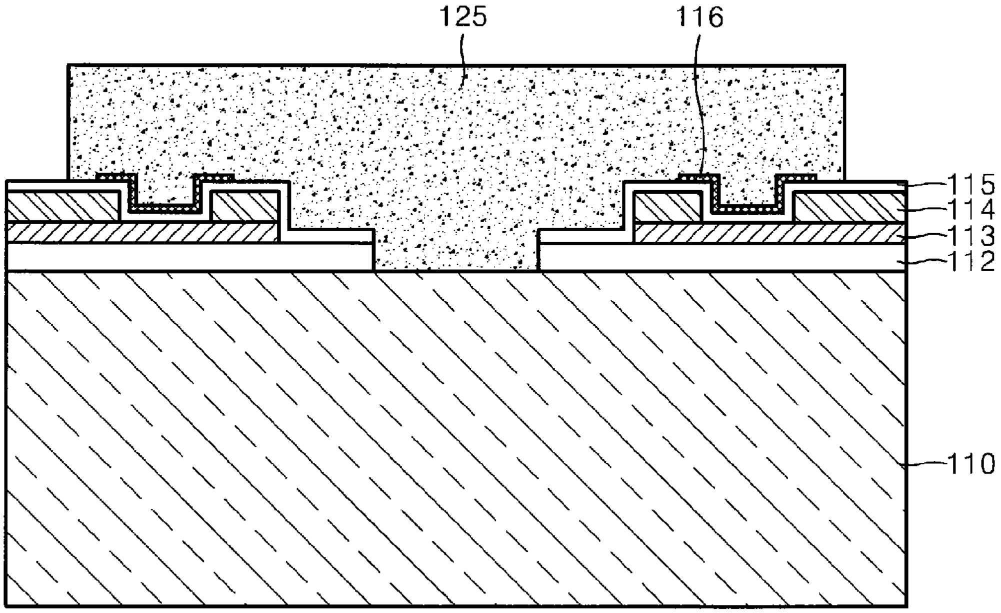

Referring to FIG. 3B, a sacrificial layer 125 is formed on the passivation layer 115 to fill the trench 117 to a predetermined thickness. The sacrificial layer 125 is formed by coating a predetermined material, for example, a photoresist or photosensitive polymer, on the passivation layer 115 and patterning the material in a predetermined shape. The sacrificial layer 125 is removed later to form an ink chamber 122 shown in FIG. 3H, and thus the sacrificial layer 125 has a shape of the ink chamber 122. Accordingly, the ink chamber 122 can be obtained with a desired height by controlling the thickness of the sacrificial layer 125.

Figure 3C:
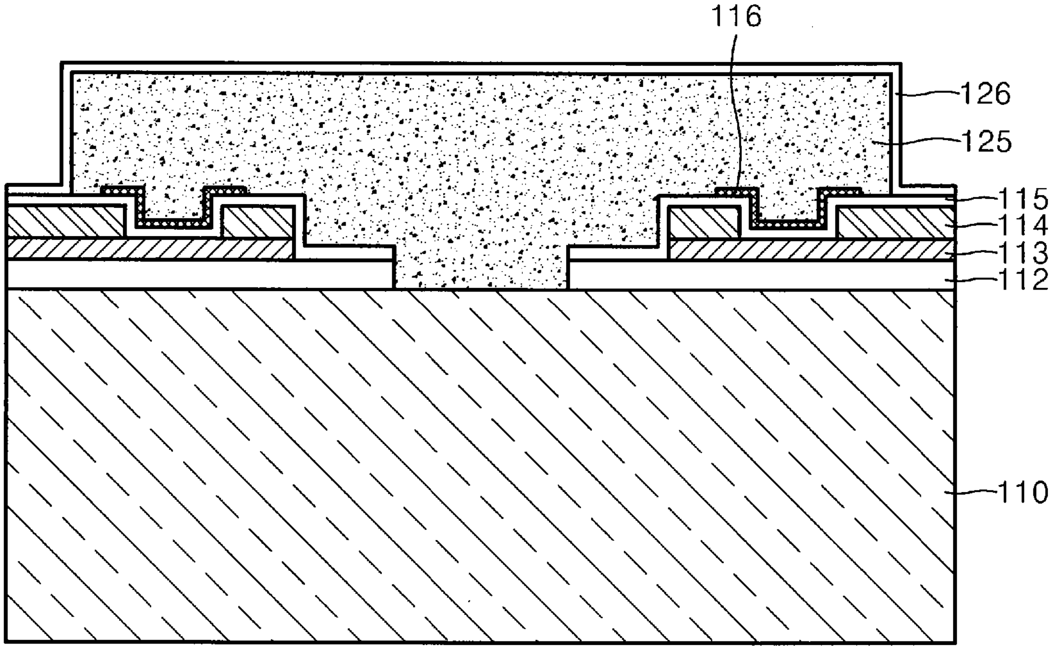

Referring to FIG. 3C, a seed layer 126 to provide plating is formed on the entire surface of the result of FIG. 3B. The seed layer 126 is formed by depositing a predetermined metal on the surface of the sacrificial layer 125 and the passivation layer 115 using a sputtering method. The seed layer 126 may be formed of at least one metal selected from the group consisting of copper, gold, nickel, titanium, and chrome.

Figure 3D:
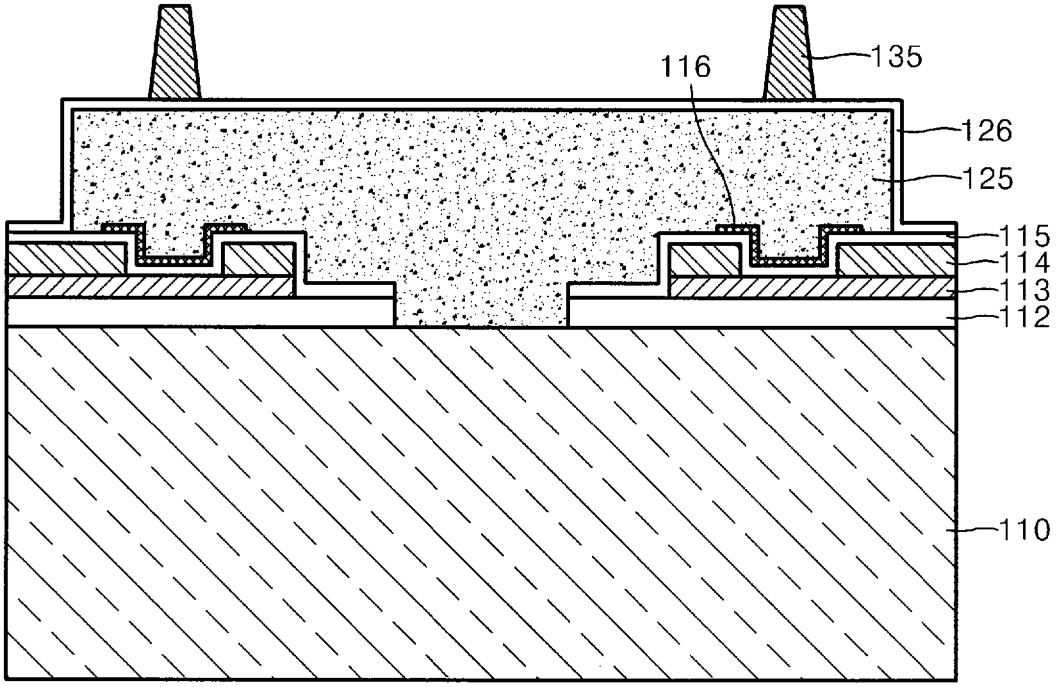

Next, referring to FIG. 3D, a nozzle mold 135 is formed on the seed layer 126 positioned over the heater 113 to a predetermined height. The nozzle mold 135 can be formed by coating a predetermined material, for example, a photoresist or a photosensitive polymer, and patterning the material in a predetermined shape. The nozzle mold 135 is removed later to form a nozzle 132 illustrated in FIG. 3H, and thus the nozzle mold 135 is formed in the shape of a nozzle 132. The nozzle mold 135 may have a cross section tapering upward.

Figure 3E:
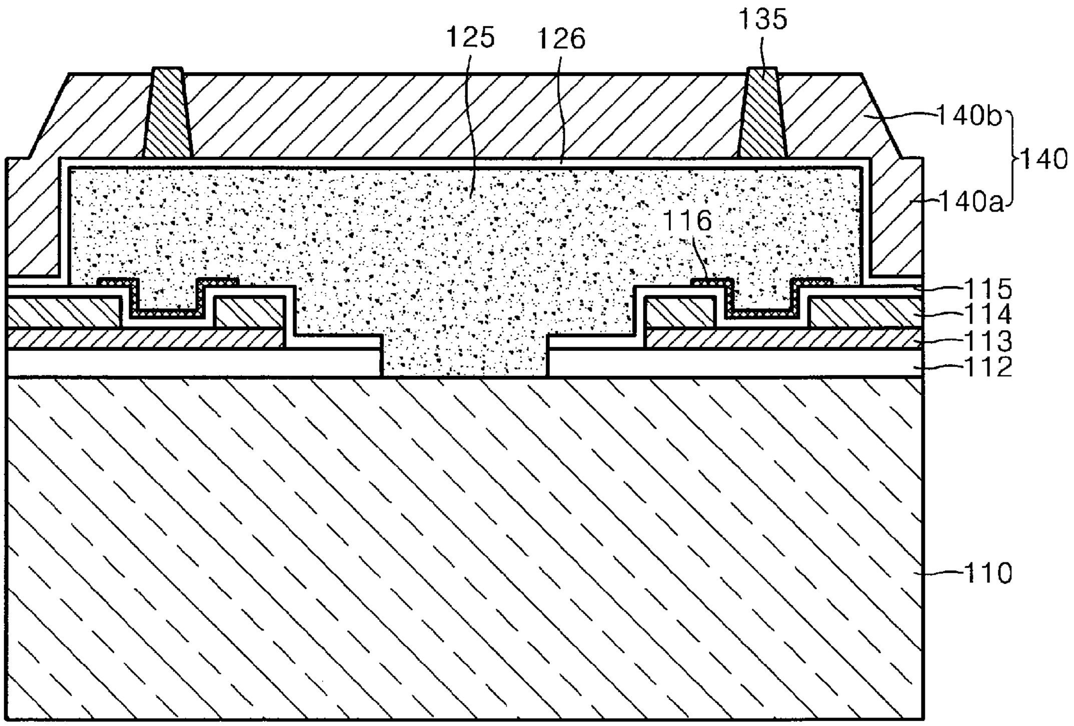

Next, referring to FIG. 3E, when a predetermined metal is plated on the seed layer 126, a plating layer 140 incorporating a chamber layer 140*a* and a nozzle layer 140*b* is formed. That is, the plating layer 140 formed on the passivation layer 115 functions as a chamber layer 140*a* and the plating layer 140 formed on the sacrificial layer 125 functions as a nozzle layer 140*b*. The plating layer 140 may be formed of a metal having good thermal conductivity to efficiently dissipate heat generated in the heater 113 to the outside. In detail, the plating layer 140 may be formed of at least one metal selected from the group consisting of copper, gold, and nickel. The plating layer 140 may be formed using an electroplating method. The electroplating process is completed when the plating layer 140 is formed at a height lower than the height of the nozzle mold 135 and when a desired outlet cross section of the nozzle 132 is formed. Accordingly, the nozzle 132 can be obtained with a desired height by controlling the thickness of the plating layer 140.

Figure 3F:
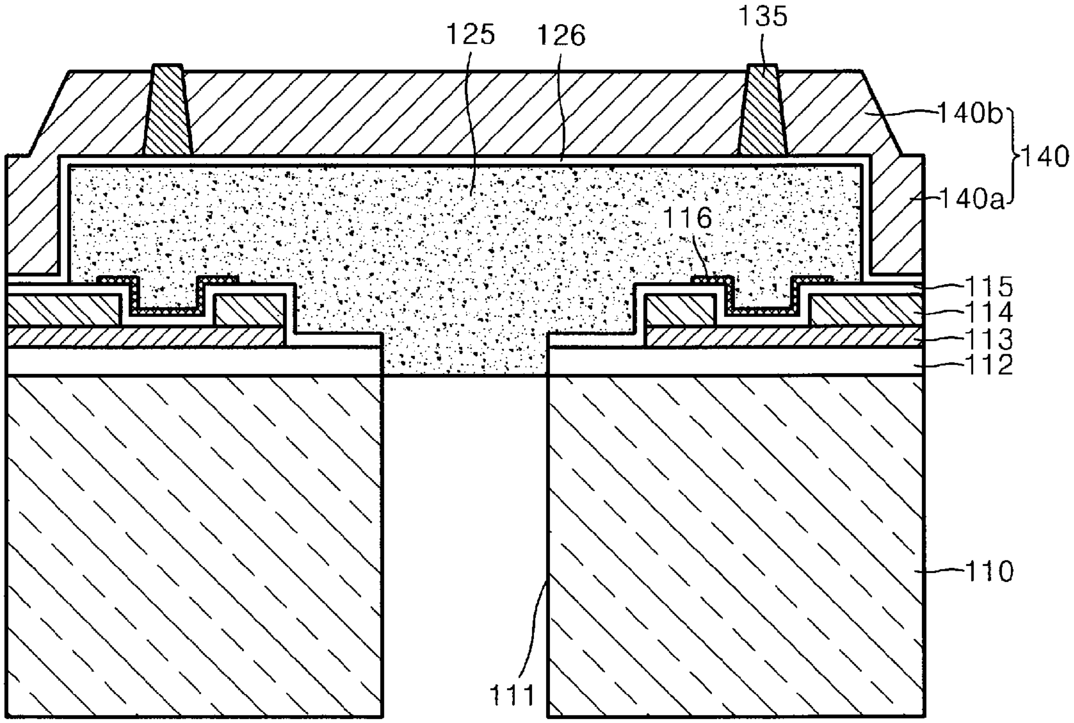
Figure 3G:
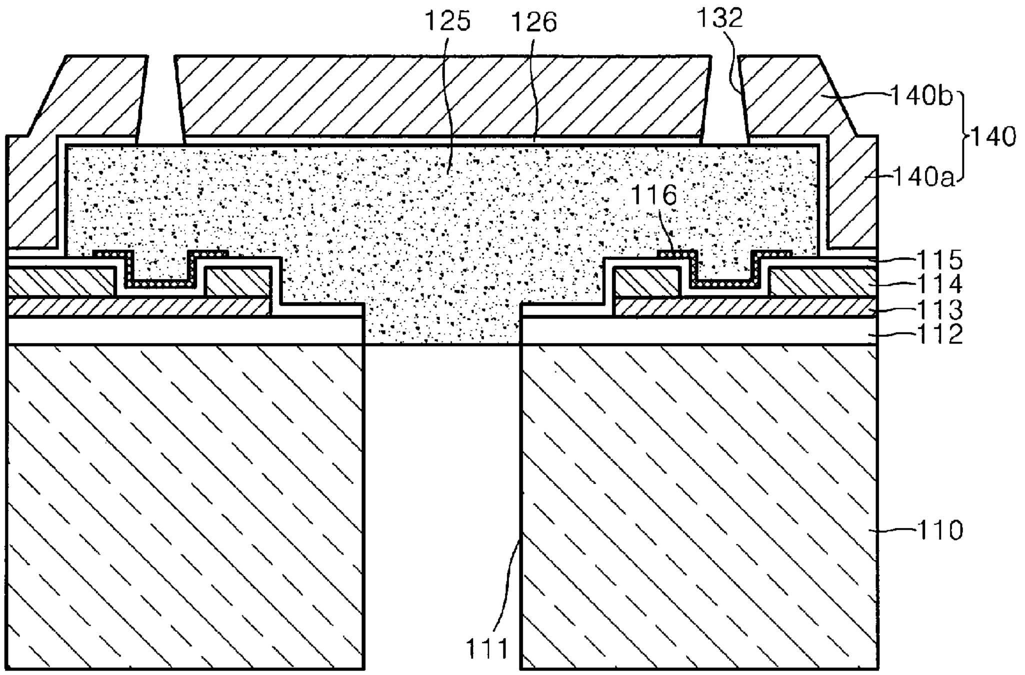

Next, referring to FIG. 3F, an ink feed hole 111 to supply ink is formed by etching the substrate 110. In detail, the ink feed hole 111 is formed by wet etching or dry etching a rear substrate of the substrate 110 until the sacrificial layer 125 filled in the trench 117 is exposed. Next, referring to FIG. 3G, when the nozzle mold 135 and the seed layer 126 formed under the nozzle mold 135 is sequentially etched and removed, the nozzle 132 through which ink is ejected is formed. A top surface of the sacrificial layer 125 is exposed through the nozzle 132. The nozzle 132 can be formed before the ink feed hole 111 is formed.

Figure 3H:
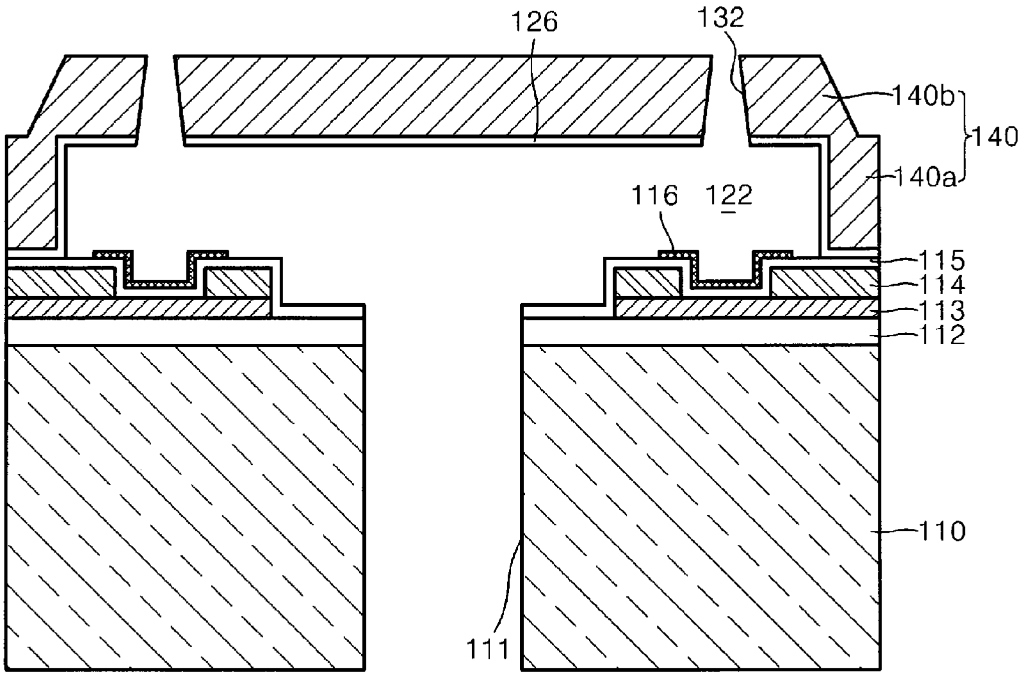

Finally, referring to FIG. 3H, the sacrificial layer 125, which is exposed through the ink feed hole 111 and the nozzle 132, is etched and removed, and thus an ink chamber 122 is formed. Thus the inkjet printhead is completed.

As described above, the present general inventive concept can form a plating layer as a single body including a chamber layer and a nozzle layer. Thus, the inkjet printhead can be fabricated in a simple process. In addition, the thickness of the sacrificial layer and the plating layer are controlled to obtain an ink chamber and a nozzle of a desired size. Also, since the plating layer is made of a metal having good thermal conductivity, the heat generated by the heater can be efficiently dissipated to the outside.

The general inventive concept may, however, be embodied in many different forms and should not be construed as being limited to the embodiments set forth herein; rather, these embodiments are provided so that this disclosure will be thorough and complete, and will fully convey the concept of the inventive concept to those skilled in the art. For example, it will also be understood that when a layer is referred to as being "on" another layer or a substrate, it can be directly on the other layer or the substrate, or intervening layers may also be present. The components of the inkjet printhead according to the present general inventive concept may be made of different materials from those described in the current embodiments. Also, the sequence of stages of the method of fabricating the inkjet printhead may vary from the embodiments of the present general inventive concept. Therefore, the spirit and scope of the present general inventive concept should be defined by the following claims.

What is claimed is:

1. A method of fabricating an inkjet printhead comprising:

sequentially forming an insulating layer, a heater, and an electrode on a substrate, and forming a passivation layer on the insulating layer to cover the heater and the electrode;

forming a trench that exposes the substrate by sequentially etching the passivation layer and the insulating layer;

forming a sacrificial layer to form an ink chamber on the passivation layer to fill the trench;

forming a seed layer to provide a plating on the sacrificial layer and the passivation layer;

forming a nozzle mold on the seed layer positioned over the heater;

forming a plating layer on the seed layer to a predetermined thickness;

forming an ink feed hole by etching a rear surface of the substrate to expose the sacrificial layer filled in the trench;

forming a nozzle by sequentially removing the nozzle mold and the seed layer positioned under the nozzle mold; and forming the ink chamber by removing the sacrificial layer exposed by the nozzle and the ink feed hole.

2. The method of claim 1, wherein the substrate is made of silicon.

3. The method of claim 1, wherein the insulating layer is made of silicon oxide.

4. The method of claim 1, wherein the heater is formed by depositing a heating resistor on a top surface of the insulating layer and patterning the heating resistor.

5. The method of claim 1, wherein the electrode is formed by depositing a conductive metal on a top surface of the heater and patterning the metal.

6. The method of claim 1, wherein the passivation layer is made of silicon oxide and silicon nitride.

7. The method of claim 1, further comprising:

after the forming of the passivation layer, forming an anti-cavitation layer on a top surface of the passivation layer that forms the bottom of the ink chamber.

8. The method of claim 7, wherein the anti-cavitation layer is made of tantalum (Ta).

9. The method of claim 1, wherein the sacrificial layer is formed by coating a predetermined material on the passivation layer and patterning the material in a shape of the ink chamber.

10. The method of claim 9, wherein the sacrificial layer is formed of a photoresist or a photosensitive polymer.

11. The method of claim 1, wherein the seed layer is made of at least one metal selected from the group consisting of copper, gold, nickel, titanium, and chrome.

12. The method of claim 11, wherein the plating layer is made of at least one metal selected from the group consisting of copper, gold, and nickel.

13. The method of claim 1, wherein the plating layer is formed by electroplating.

14. The method of claim 1, wherein the nozzle mold is made of a photoresist or a photosensitive polymer.

15. The method of claim 1, wherein the nozzle mold has a cross section tapering upward.

16. The method of claim 1, wherein the seed layer is formed by depositing a predetermined metal on the surface of the sacrificial layer.

17. The method of claim 16, wherein the seed layer is deposited by a sputtering method.

18. A method of fabricating an inkjet printhead, comprising:

forming a sacrificial layer over a thermal heating device of the inkjet printhead to form an ink chamber;

forming a seed layer to provide plating on the sacrificial layer and thermal heating device;

forming a nozzle mold on the seed layer positioned over the thermal heating device;

forming a plating layer on the seed layer to a predetermined thickness;

forming an ink feed hole by etching a rear surface of the thermal heating device to expose the sacrificial layer;

forming a nozzle by sequentially removing the nozzle mold and the seed layer positioned under the nozzle mold; and forming the ink chamber by removing the sacrificial layer exposed by the nozzle and the ink feed hole.

19. The method of claim 18, wherein the seed layer is formed by depositing a predetermined metal on the surface of the sacrificial layer.

20. The method of claim 18, wherein the plating layer comprises a nozzle layer and a chamber layer formed during a single process.

21. A method of fabricating an inkjet printhead, comprising:

forming a sacrificial layer over a thermal heating device including heaters of the inkjet printhead to form an ink chamber;

forming a nozzle mold on the sacrificial layer and above each heater;

forming a plating layer on the sacrificial layer and along sides of each nozzle mold to a predetermined thickness;

forming an ink feed hole by etching a rear surface of the thermal heating device to expose the sacrificial layer;

forming nozzles by sequentially removing each nozzle mold; and forming the ink chamber by removing the sacrificial layer exposed by the nozzles and the ink feed hole.

22. The method of claim 21, wherein the forming of the nozzle mold comprises:

forming a seed layer over the sacrificial layer to provide plating on the sacrificial layer and thermal heating device; and forming the nozzle mold over the seed layer and above each heater.

* * * * *